Aug. 31, 1954     E. F. WELLER, JR     2,688,126
COMBINED SPARK IMPULSE INDICATOR

Filed Jan. 30, 1951     3 Sheets-Sheet 1

Inventor
Edward F. Weller, Jr.
By Willits, Helwig & Baillo
Attorneys

Patented Aug. 31, 1954

2,688,126

UNITED STATES PATENT OFFICE 2,688,126

COMBINED SPARK IMPULSE INDICATOR

Edward F. Weller, Jr., Detroit, Mich., assignor to General Motors Corporation, Detroit, Mich., a corporation of Delaware Application January 30, 1951, Serial No. 208,519

13 Claims. (Cl. 340—268)

1

This invention relates to indicating apparatus, and more particularly to apparatus for providing a simultaneous indication of a plurality of sequentially occurring cyclically repeating voltages, the apparatus being particularly adapted for use as a spark advance indicator for internal combustion engines.

One feature of the invention is that it provides improved apparatus for providing a simultaneous indication of a plurality of sequentially occurring cyclically repeating voltages; another feature of the invention is that it provides a simultaneous visual indication of the amount of spark advance for each cylinder of a multi-cylinder engine; a further feature of the invention is that the indication of the spark impulse for each cylinder appears along a different electronically developed sweep trace on the face of an oscilloscope; still another feature of the invention is that marking impulses are provided to indicate the number of degrees of spark advance for each cylinder; yet a further feature of the invention is that a timing impulse is provided in connection with each cylinder to indicate a predetermined position in a cycle of operation of each cylinder, as, for example, top dead center position; still another feature of the invention is that means are provided for controlling the length of each sweep trace so that each sweep trace is of constant length regardless of engine speed; and yet a further feature of the invention is that the timing marks which indicate a predetermined position in a cycle of operation of each cylinder are each divided into two portions and means are provided for differentiating these marks to provide an accurate indication of the center thereof in order to increase the accuracy of the device in indicating the degrees of spark advance.

Other features and advantages of the invention will be apparent from the following specification taken in connection with the drawings, in which:

Figure 5 is a

2 timing chart showing wave forms taken at various points in the circuit of the apparatus; and Figure 6 is a schematic diagram of the circuit of the apparatus.

Many attempts have been made to provide a spark advance indicator which would provide a visual indication of the amount of spark advance in the various cylinders of an internal combustion engine, as, for example, an automobile engine. In the past, most of these devices utilized a flashing light which was rotated, generally at crankshaft speed, and which provided a stroboscopic effect against a protractor background. Such devices generally would only provide an indication of the spark advance of a single cylinder at any one time, and in addition such devices were particularly disadvantageous in that in order to utilize the device it was necessary to remove the distributor from the engine. In other words, these devices were purely bench test devices.

Other devices have been developed to provide a meter type of visual indication. The spark which causes the ignition ordinarily preceds top dead center position of the piston by several degrees, this angle or time difference being known as the spark advance of the engine. In this type of spark advance indicator the time is measured between the spark impulse and the time when the cylinder reaches top dead center position and this time period is compared with the time from top dead center position to the next spark impulse. This is done by using an electronic switch which is closed by the spark impulse and opened when the piston reaches top dead center position. During the closure time a current of regulated amplitude is allowed to flow and the time during which the current flows, when compared to the total time of a cycle or with the time when no current flows, determines the degrees of spark advance. Obviously this method depends for its accuracy upon many factors such as the quality of the meter, the regulation of the vacuum tubes or other means for determining current flow, and the like.

The apparatus of the present invention provides a vastly superior type of indication in that it simultaneously indicates the spark impulse from each cylinder of a multi-cylinder engine. In the improved apparatus a circuit is provided for developing a first sweep voltage equal in frequency to the repetition rate of the spark in one cylinder multiplied by the number of cylinders in the engine. This sweep appears on the oscilloscope as the horizontal sweep. Another circuit is provided for developing a second sweep voltage equal in frequency to the spark repetition rate in one cylinder. This second sweep is utilized to obtain scanning lines so that there are a plurality of horizontal sweep lines, one for each engine cylinder. Circuit connections between the vertical sweep circuit and the spark sources provide means for modulating each cycle of the second or vertical sweep with a spark impulse from one cylinder, and inasmuch as a combined indication is provided on the face of the oscilloscope, the operator sees a plurality of spaced horizontal sweep lines arranged in conventional scanning steps, and upon each horizontal sweep line is an indication of the spark impulse from one cylinder of the engine. In addition to showing the spark impulse, I provide marking impulses which may indicate any predetermined number of degrees of engine revolution along each sweep line, as for example, 5 degree marker pips. In order properly to locate the time of the spark impulse with reference to a known point in the operation of the engine, I provide timing impulses which are of different conformation from the marking impulses and which may be used to indicate top dead center or any other predetermined position in a cycle of operation in each one of the engine cylinders.

According to the present invention the sweep voltages are electronically developed in circuits controlled by a series of triggering pips. In the co-pending application of Walter E. Sargeant, filed January 30, 1951, as Serial No. 208,536, a somewhat similar indicating system is disclosed and claimed in which the sweep voltages are mechanically developed.

As a further feature of the invention a direct current control voltage is developed from the marker impulses for controlling the amplitude of the horizontal sweep voltage. Because the repetition rate of the marker impulses varies as a direct function of the speed of the engine, the amplitude of the control voltage developed from these impulses also varies directly as a function of the speed of the engine, and consequently I am able to maintain the horizontal sweep of constant length despite variations in engine speed over a very wide range.

While the invention will be described as a spark advance indicator, it should be understood that it is applicable to many other uses. For example, instead of utilizing spark impulses, the sequentially occurring cyclically repeating voltages which are indicated by the device, might be obtained as a function of pressure variations in a cylinder, or as a function of any other repeating phenomena.

Figures 1, 2, 3:
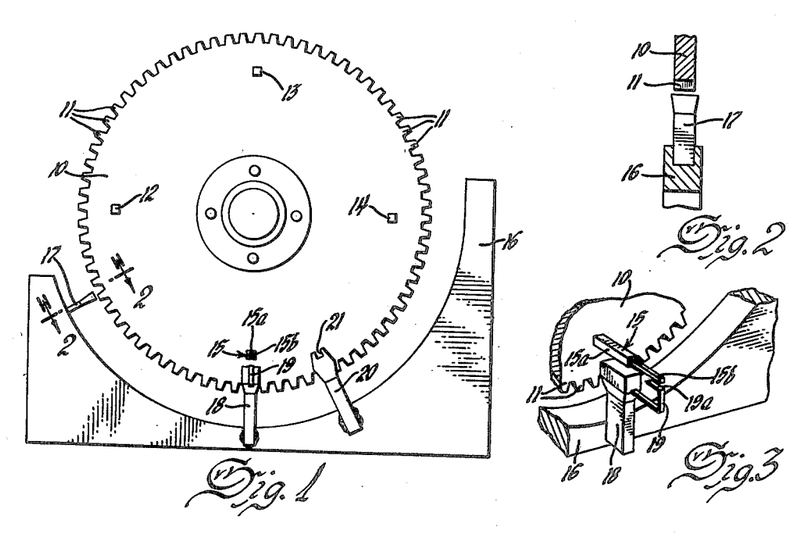
Figure 1 is a front elevational view of the flywheel of an automobile engine having pickup means for developing impulses for use in circuits of the indicating apparatus.
Figure 2 is a fragmentary detail section taken along the line 2—2 of Figure 1.
Figure 3 is a fragmentary perspective view of a portion of the flywheel and associated pickup apparatus.

Referring now more particularly to the drawings, the flywheel of an engine, as for example, an automobile engine, is designated in Figures 1, 2, and 3 by the reference character 10. In a conventional automobile, this flywheel is driven at crankshaft speed, which is twice camshaft speed, the flywheel turning through two revolutions during each engine cycle. On the periphery of the flywheel are a plurality of gear teeth 11. Projecting from the face of the flywheel are a plurality (4 as illustrated) of pins 12, 13, 14, and 15. The pins 12, 13, and 14 are rectangular in transverse section and project outwardly an equal distance from the face of the disc. The pin 15 has a portion 15a which is similar in size and shape to the pins 12—14, and a smaller portion 15b extends outwardly from the end of the portion 15a. The pins 12—15 are of conducting material and are grounded by their metallic connection with the flywheel. As shown in Figure 1, the pins are equally spaced around the face of the flywheel. The apparatus illustrated is for use with an eight cylinder engine, and in this event four pins are used. The number of pins is equal to one half the number of engine cylinders, inasmuch as the flywheel rotates through two revolutions for each engine cycle, each pin being utilized to provide horizontal sweep traces to indicate operating conditions in two cylinders.

A mounting bracket 16 of electrically insulating material is mounted adjacent the periphery of the flywheel, the inner surface of this mounting bracket being in the form of an arc concentric with the flywheel. A pickup member 17 projects from the inner arcuate edge of the mounting bracket 16 and terminates closely adjacent the teeth 11 of the flywheel. This pin has a flat outer end or pickup surface preferably of somewhat larger area than the area of one of the gear teeth 11. Another pickup member 18 is mounted on the bracket 16 and projects adjacent the face of the flywheel 10 so that the pins 12—15 will pass closely adjacent the flat pickup face of the pickup member 18 as the flywheel rotates. The face of the pickup member 18 is of such depth that the outer edge of each of the pins 12, 13, and 14 and the outer edge of the pin portion 15a pass closely adjacent the outer edge of the face of the pickup member.

An L shaped auxiliary pickup member 19 projects outwardly from the pickup member 18, a portion 19a of the member 19 being positioned closely adjacent the path of rotation of the extending pin portion 15b. Inasmuch as the projecting or auxiliary pickup member 19 projects beyond the end of the pins 12, 13 and 14 and the portion 15a of the pin 15, it is not affected by any of the pins except the extending pin portion 15b. A third pickup member 20 projects from the supporting bracket 16 adjacent the face of the disc and closely adjacent the path of rotation of the pins 12, 13, 14 and 15a. The face of the pickup member 20 is notched as shown at 21, this notch being centrally located in said face and extending throughout the entire depth thereof.

The pickup members 17, 18, 19 and 20 are of conducting material and are connected by means of leads to the electrical circuits of Figure 6, and these pickup members, in cooperation with the respective gear teeth and pins on the face of the disc, comprise condenser pickups as will be more fully described in connection with Figure 6.

In the operation of the apparatus, the gear teeth 11 cooperate with the pickup member 17 to provide a plurality of marking impulses; the respective pins 12, 13, 14 and 15a cooperate with the pickup member 18 to provide first triggering impulses for developing first or horizontal sweep impulses; the auxiliary pin 15b cooperates with the auxiliary pickup member 19 to provide second or vertical sweep triggering impulses; and the respective pins 12, 13, 14 and 15a, cooperate with the pickup member 20 to provide timing impulses each of which indicates a predetermined position in a cycle of operation of one of the cylinders of the engine, as top dead center position.

Inasmuch as the flywheel 10 is driven at crankshaft speed—i. e., twice camshaft speed—two revolutions of the flywheel will occur during each engine cycle, and the four pins 12, 13, 14 and 15a will provide 8 capacitive impulses, each of which may be utilized to provide a separate sweep voltage representative of a cycle of operation of each cylinder of an eight cylinder engine. Obviously, for use in a six cylinder engine only three pins would be used, these pins being spaced at 120° intervals on the face of the flywheel 10.

The pin 15b, in cooperation with the pickup member 19, may be utilized to provide a triggering impulse representative of each engine cycle, provided, however, that only every alternate impulse from the member 19 is utilized. The pins 12, 13, 14, and 15a, in cooperation with the pickup member 20 may provide an impulse representative of some predetermined position in the cycle of operation in each cylinder. While any predetermined position may be represented according to the angular location of the pickup member 20, I prefer that this member be so positioned that one of the pins on the flywheel passes closely adjacent the face of the member 20 each time the piston in one of the cylinders is at top dead center position. The marking impulses which are developed as the gear teeth 11 pass closely adjacent the pin 17 may provide an indication of degress of a cycle of operation of the engine, and while any number of teeth may be utilized, I prefer to so proportion the teeth that the marking impulses are spaced 5 degrees from each other along the sweep line, thus providing a ready referance to determine the number of degrees of spark advance.

Figure 4:
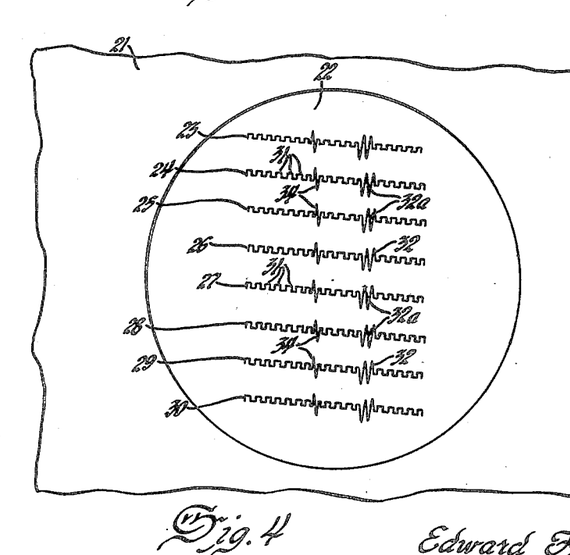
Figure 4 is a fragmentary front elevational view of an oscilloscope, showing the indication which the apparatus provides for indicating degrees of spark advance in an eight cylinder engine.

Figure 4 shows the face of a cathode ray oscilloscope tube providing a combined indication of all of the impulses while the apparatus is in operation. The front panel 21 of the oscilloscope has an opening through which the face 22 of the cathode ray tube may be seen. The triggering impulses developed as the pins 12, 13, 14 and 15a pass closely adjacent the pickup member 18 appear as horizontal sweep traces 23—30, respectively, and alternate ones of the second triggering impulses provided by the pin 15b and pickup member 19 are utilized to provide a vertical or scanning sweep to insure cyclical repetition of the horizontal sweep traces in synchronism with the speed of engine revolution. The marking impulses developed by the gear teeth 11 and pickup member 17 appear as a plurality of cyclically repeating equally spaced pips 31 having a repetition rate such that the space between the leading edge of one pip and the leading edge of the adjacent pip represents a predetermined number of degrees in a cycle of operation in the engine. As pointed out above, it is convenient to so proportion the teeth that the pips 31 provide 5 degree marks. The timing impulses provided by the pickup member 20 are shown at 32, these impulses indicating a predetermined position, as top dead center, in the cycle of operation of each cylinder. The notch 21 in the member 20 provides divided impulses, and these impulses are differentiated in the circuit of Figure 6 in such manner that the exact predetermined position is indicated at the point 32a where the center portion of each impulse crosses the horizontal sweep trace, thereby providing exact accuracy for the timing impulses.

The spark impulse which is to be indicated is shown at 34, this spark impulse occurring in advance of top dead center position in the diagram of Figure 4. Any known means may be used to provide a spark impulse from each cylinder, as for example, an inductive type pickup similar to that shown in Patent No. 2,471,968 which issued May 31, 1949, to J. D. McCullough, or a pickup of the type disclosed in the co-pending application of Walter E. Sargeant and Edward F. Weller filed November 21, 1950, as Serial No. 196,882. In the apparatus of the present invention a spark pickup would be associated with each of the eight spark plugs and the impulse provided by each spark pickup will appear at some point along the corresponding horizontal sweep traces to indicate the number of degrees of spark advance in each cylinder of the engine.

It should be noted that the indication illustrated in Figure 4 provides a simultaneous indication of all of the engine cylinders, and that the indication is "dynamic" in the sense that it instantaneously shows the present operating conditions in the cylinder, and in the sense that the apparatus may be mounted in the vehicle to provide an indication during an actual road test of the engine. Furthermore, the indication is continuous as long as the engine is running, and the indication may readily be photographed for future use if desired.

From the description of Figure 4, it will be obvious that the apparatus of the invention may be utilized to provide a simultaneous indication of a plurality of sequentially occurring, cyclically repeating voltages. While spark impulses are illustrated and described as a typical use of the invention, cyclically repeating voltages indicative of pressure conditions in the cylinders might be indicated if desired, or an indication might be provided of any other sequentially occurring, cyclically repeating voltages indicative of any cyclically recurring phenomenon.

Figure 5:
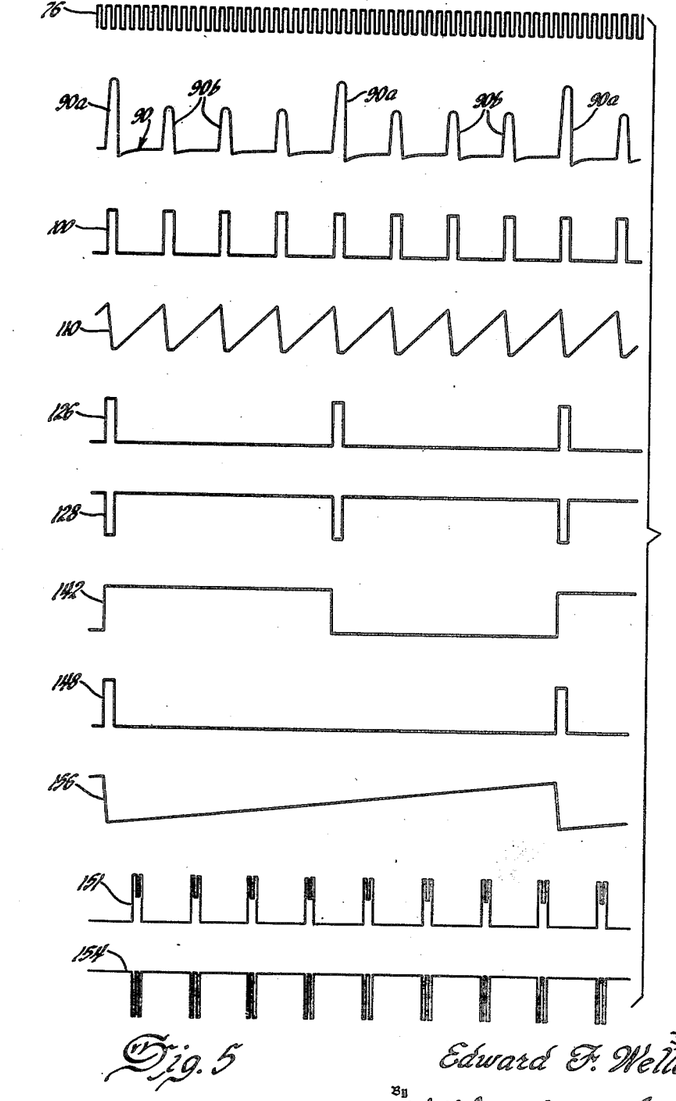
Figure 6:
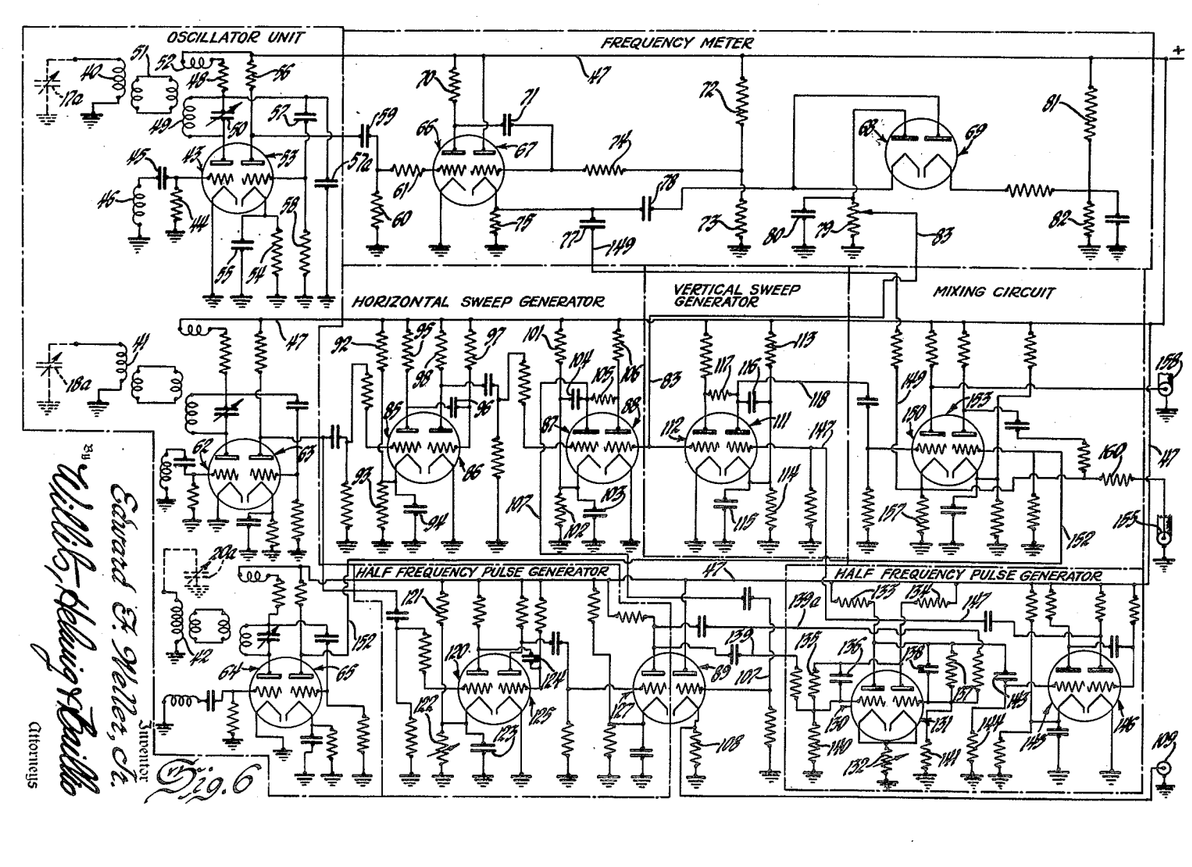

Figure 6 is a schematic diagram of the circuits utilized to provide the indication shown in Figure 4 from the impulses developed by the apparatus of Figure 1 and the spark impulses. Figure 5 is a timing chart showing the wave forms which appear at various points in the circuits of Figure 6. In Figure 5, 76 represents the wave form of the marker impulses across resistor 75; 90 represents the wave form of the horizontal sweep triggering impulses at the anode of tube 83; 100 represents the wave form of these triggering impulses at the anode of tube 86; 110 represents the horizontal sweep wave form across resistor 108; 126 represents the wave form of the vertical sweep triggering impulses at the anode of the tube 125; 128 represents the wave form of these triggering impulses at the anode of tube 127; 142 represents the output of the half frequency generating tube 136; 148 represents the wave form at the anode of tube 146; 156 represents the vertical sweep wave form at the anode of the tube 150; 151 represents the wave form of the timing impulses at the anode of tube 65; and 154 represents the wave form of the timing impulses in the anode circuit of tube 153. In the description of the circuits and their operation, the electrical apparatus will be divided into basic components including:

A. Pickups and oscillators
    B. Frequency meter
    C. Sweep generators
    D. Half frequency pulse generator
    E. Mixing circuits

A. *Pickups and oscillators*

As the flywheel 10 of Figure 1 rotates to pass the respective pins and gear teeth closely adjacent the respective pickup members, a plurality of capacitive impulses are developed. For example, when one of the gear teeth moves closely adjacent the pickup member 17, a short capacitive impulse is developed between the edge of the tooth and the adjacent face of the member 17, and similarly, cyclically repeating capacitive effects are provided as the pins on the face of the flywheel pass closely adjacent the respective pickup members 18, 19 and 20. In Figure 6, the capacitive effect between the gear teeth and the member 17 is indicated in broken lines at 17a; the capacitive effect between the pins and the pickup members 18 and 19 is indicated at 18a; and the capacitive effect between the pins and the pickup member 20 is indicated at 20a. The pickup member 17 is connected to an inductance 40 to form a series circuit which is resonant at a predetermined frequency when the capacitance 17a is at its maximum, i. e., when one of the gear teeth is most closely adjacent the face of the member 17. One end of the inductance 40 is grounded, and one side of the capacitance is grounded through the flywheel 10. Similarly, the pickup members 18 and 19 are connected to a coil 41, and the pickup member 20 is connected to a coil 42. An oscillator is provided for each of these pickup circuits. Inasmuch as these oscillators are all similar except as to frequency of operation, only one will be described in detail.

The oscillator associated with the pickup 17 comprises a triode 43 having its cathode grounded. The grid circuit includes a grid leak resistor 44 which may have a value of 25,000 ohms and a condenser 45 and an inductance 46 connected in parallel with the resistor 44. The anode of the tube is connected to a B plus lead 47 through a detecting or load resistor 48 which may have a value of 10,000 ohms, and the anode circuit incorporates an LC tank circuit comprising an inductance 49 and a capacitance 50. The tank circuit provides sufficient feedback to the grid to cause the tube to oscillate. The LC circuit of the tube is coupled to the inductance 40 by means of a link coupling device 51. As the capacitance 17a varies, the reflected impedance in the anode circuit of the oscillator varies accordingly, as disclosed in detail in the co-pending application of Wesley S. Erwin, filed November 4, 1946, as Serial No. 707,736. While the condenser 50 is made variable for purposes of initial adjustment, during operation of the device the value of this condenser remains fixed.

The oscillator circuit components are so proportioned that the range of oscillation is between 1.2 and 2.5 megacycles, and the capacitive and inductive components 17a and 40 of the load circuit are so proportioned that the resonant frequency of this circuit is in the same range. With this construction the oscillator frequency may be adjusted to fall very near the resonant frequency of the load circuit when the capacitance 17a is at a maximum.

As the gear teeth 11 pass closely adjacent the pickup member 17, the variations in the capacitance 17a are reflected back to the oscillator anode circuit through the link coupling device 51. This change in oscillator load causes the oscillator anode voltage to vary as a function of the change in the capacitance 17a, the capacitive variations appearing as voltage variations across the resistor 48. If desired, a choke 52 may be provided between the resistor 48 and the B plus lead to isolate the B plus supply from the oscillator. The B plus lead 47 may extend from a conventional power supply having a positive voltage output of the order of 240 volts D. C., and the tubes of the circuit may have a conventional filament voltage supply.

An amplifier tube 53 is shown as being contained in the same envelope as the tube 43. In the circuit illustrated dual tubes may conveniently be employed throughout, and in each case the separate functional tube parts will be referred to as a tube, despite the fact that more than one tube may be housed in the same envelope. The tube 53 has its cathode connected to ground through a resistor 54 which may have a value of 5,000 ohms and which is by-passed for A. C. by a condenser 55 which may have a value of 8 microfarads. The anode of the tube 53 is connected to the B plus lead 47 through a dropping resistor 56 which may have a value of 200,000 ohms, and the grid of the tube 53 is coupled to one end of the detecting resistor 48 through a coupling condenser 57 which may have a value of .05 microfarad and a grid resistor 58 which may have a value of 500,000 ohms. A condenser 57a, which may have a value of 500 microfarads may be provided to by-pass the load resistor 48. The output voltage impulses are coupled from the anode circuit of the tube 53 into the input circuit of the first stage of a frequency meter through a coupling condenser 59 which may have a value of .05 microfarad, a resistor 60 which may have a value of 500,000 ohms, and a grid input resistor 61 which may have a value of 100,000 ohms.

The changes in the capacitance 18a which occur as the respective pins 12, 13, 14 and 15 pass closely adjacent the pickup members 18 and 19 are similarly reflected into the anode circuit of an oscillator tube 62 and are detected and amplified in a tube 63. This oscillator may be tunable over a range from 1.7 to 3.0 megacycles and is adjusted to operate on the resonance curve of the series circuit comprising the capacitance 18a and the inductance 41. The variations in the capacitance 20a caused by the passage of the pins 12, 13, 14 and 15a closely adjacent the pickup member 20 are reflected into the anode circuit of an oscillator tube 64, are detected and are amplified by a tube 65. This last mentioned oscillator may be tunable over a range from 2.1 to 3.7 megacycles and is adjusted to operate on the resonance curve of the series circuit comprising the capacitance 20a and the inductance 42.

In connection with the pulses developed by the pickup member 18 for controlling the horizontal sweep, it is necessary that the pulses developed as the pin 15 passes closely adjacent the member 18 have the same width (time duration) as the pulses developed by the other pins, even though the pulses developed by the pin 15 have greater amplitude than the pulses developed by the pins 12, 13 and 14. Any variation in the width of one of the pulses would result in the sweep trace starting at a different point on the oscilloscope screen for one cylinder. This equality of width is provided by the construction of the pin 15 and the pickup members 18 and 19. The portion 15a of the pin provides a capacitive effect only in cooperation with the main pickup member 18, and the extending portion 15b of the pin provides a capacitive effect only in cooperation with the projecting pickup member 19 so that the pulses developed by the pin 15 have the same width as the pulses developed by the pins 12, 13 and 14, but the pin 15 develops a pulse of greater amplitude.

B. *Frequency meter*

The frequency meter comprises a pair of triodes 66 and 67 and a pair of diodes 68 and 69. The frequency meter circuit shapes the marking pulses and also provides a D. C. voltage which is proportional to the speed of operation of the engine. This voltage is used in the sweep generator circuits to keep the amplitude of sweep voltage constant as the engine speed changes. Inasmuch as the horizontal sweep voltage is triggered by the pulses from the pickup 18, the repetition rate of the sweep voltage is a direct function of engine speed, and consequently the amplitude of sweep voltage developed (and thus the length of each sweep trace) would be greater at low speeds of engine operation than at high speeds. The frequency meter circuit provides a negative biasing voltage the amplitude of which is directly proportional to the speed of engine operation. This biasing voltage is used to control the operation of one of the sweep forming tubes, and with this arrangement I am enabled to maintain the amplitude of the sweep voltage constant over approximately a 10 to 1 variation in engine speed.

The triode 66 is a pulse shaper. The cathode is connected to ground and the anode is connected to the B plus lead through a resistor 70 which may have a value of 100,000 ohms. The plate of the triode saturates, so that the input pulses are clipped and formed into substantially square waves which are coupled through a condenser 71 (which may have a value of .05 microfarad) to the grid of the succeeding triode 67. This grid is maintained at a positive voltage by a voltage divider network between B plus and ground comprising resistors 72 and 73 which may have respective values of 120,000 ohms and 30,000 ohms, and a connection is made from this divider to the grid through a resistor 74 which may have a value of 120,000 ohms. The tube 67 is connected as a cathode follower to provide a low impedance source for the succeeding rectifier, a resistor 75 having a value of 10,000 ohms being connected between the cathode and ground, and the tube output being taken across this resistor.

The voltage wave shape across the cathode load resistor of the triode 67 is shown in Figure 5 at 76. These square wave marking pulses are coupled through a condenser 77 having a value of .002 microfarad to a mixing circuit which will be hereinafter described.

The square wave pulses are also coupled through a condenser 78 to the cathode of the diode rectifier 68. The anode of this rectifier is connected to ground through an averaging circuit comprising a potentiometer 79 which may have a value of 20,000 ohms and a condenser 80 which may have a value of .05 microfarad, connected in parallel. The pulses are differentiated by the rectifier and the differentiated pulses charge the condenser which discharges at a substantially constant rate through the potentiometer 79.

The rectifier 69 balances out the current which flows when the plate voltage is zero. The anode of the rectifier 69 is connected to the source of square wave pulses and the cathode is biased positively by a voltage divider network comprising resistors 81 and 82 connected between B plus and ground and having respective values of 150,000 ohms and 10,000 ohms. By coupling the pulses into the cathode circuit of the diode 68, a negative D. C. voltage is developed across the potentiometer 79, and the movable tap of this potentiometer is connected to a lead 83 which in turn is connected into the input circuit of control tubes in the sweep generating circuits, as will hereinafter appear.

C. Sweep generators

The horizontal sweep generator comprises tubes 85, 86, 87, 88 and 89. The triodes 85 and 86 are pulse shaping tubes which develop the pulses necessary to reset the sweep generator, the triode 88 is a control tube for determining the sweep amplitude, and the triode 87 is the sweep generating tube. The pulses provided by the pickup members 18 and 19 are designated generally at 90 in Figure 5 as they appear at the plate of the amplifier tube 63. The pulses 90a are developed as the pin 15 passes the pickup members, and the pulses 90b are developed as the pins 12, 13 and 14 pass the pickup members. The width of the pulses 90a and 90b (at the base line) is constant, but the pulses 90a are of greater amplitude due to the superimposition of the capacitance between the pin portion 15b and the pickup member 19.

The cathode of the triode 85 is positively biased by means of a divider network connected between B plus and ground and comprising resistors 92 and 93 which may have values of 100,000 ohms and 2,500 ohms respectively. An 8 microfarad condenser 94 is connected across resistor 93. The plate load of the triode 85 comprises a resistor 95 which may have a value of 30,000 ohms, and the amplified, clipped signal output is coupled through a condenser 96 to the positively biased grid of the triode 86. This latter grid is positively biased by means of a resistor 97 which is connected to the B plus lead and which may have a value of 500,000 ohms. The anode of the triode 86 is connected to B plus through a resistor 98 which may have a value of 100,000 ohms, and the clipped triggering pulses are coupled into the input of the sweep generating tube 87. The wave form of these pulses at the plate of the triode 86 is shown in Figure 5 at 100.

The cathode of the sweep generating triode 87 is connected to a voltage divider network comprising resistors 101 and 102 which are connected in series between B plus and ground and which may have respective values of 25,000 ohms and 15,000 ohms. A condenser 103, which may have a value of 56 microfarads, is connected across the resistor 102. In the anode circuit of the triode 87 is a sweep generating condenser 104 which may have a value of .01 microfarad and which is connected between the anode and the above described voltage divider network. The anode of the tube 87 is also connected to the anode of the sweep amplitude control tube 88 through a resistor 105 which may have a value of 10 megohms. As earlier pointed out the negative bias voltage from the frequency meter circuit is connected to the grid of the sweep amplitude control tube 88, the anode of this tube being connected to the charging resistor 105 above described and to the B plus supply through a resistor 106 which may have a value of 100,000 ohms.

In the operation of the sweep circuit, the plate voltage of the control tube 88 determines the potential to which the condenser 104 will charge, and the higher this charging potential the greater the amplitude of the sweep voltage which will be developed. The negative bias from the frequency meter circuit determines the plate current flow through the tube 88, and consequently determines the plate voltage of this tube and the amount of charge which the condenser 104 is allowed to take. When the positive triggering pulses 100 are applied to the grid of the sweep generating tube 87, this tube conducts heavily and condenser 104 is discharged back to a voltage level determined by the voltage divider network including resistors 101 and 102 and condenser 103. In the construction of the circuit the RC time constant of the charging circuit is made very long despite the fact that the condenser 104 is necessarily relatively small so that it may always discharge back to the same voltage level through the triode 87. If the charging circuit time constant is too short the sweep will not be a substantially straight line but will give the appearance of the exponential charging curve of the condenser. On the other hand, if the sweep generating condenser 104 is made too large, the triode 87 cannot pass enough current to discharge the condenser always to the same voltage level.

That portion of the condenser charging curve which is utilized as the sweep voltage is coupled through a lead 107 into the grid circuit of the triode 89 which is connected as a cathode follower impedance step-down stage, and the sweep voltage is taken from across a cathode resistor 108 which may have a value of 25,000 ohms. The voltage wave form across this resistor is shown in Figure 5 at 110. The horizontal sweep voltage may be applied to the oscilloscope through a shielded cable 109.

One sweep trace is triggered by the capacitance developed by each of the pins 12, 13, 14 and 15. Inasmuch as these pins rotate at crankshaft speed, each pin triggers two sweep cycles during each engine cycle. The clipping action of the triodes 85 and 86 prevents the large amplitude pulses developed by the pin 15 from having any different effect upon the sweep circuit than the smaller amplitude pulses developed by the pins 12, 13 and 14.

The vertical sweep is generated by a triode 111 and associated circuits, a control triode 112 being utilized to control the amplitude of the sweep voltage in accordance with the speed of engine operation. The vertical sweep generating circuits are substantially identical with the horizontal sweep circuits above described and will not be described in great detail.

The sweep control biasing voltage from the frequency meter is also applied to the grid of tube 112 in order to control its plate voltage in accordance with engine speed in the same manner as above described in connection with the triode 88. The sweep generating circuit proper comprises a cathode biasing network including resistors 113 and 114 which may have respective values of 25,000 ohms and 15,000 ohms, and a condenser 115 which is connected across the resistor 114 and which may have a value of 56 microfarads. The sweep generating condenser 116 may have a value of 1 microfarad and the charging resistor 117 may have a value of 15 megohms. These large values are due to the fact that the vertical sweep is slower than the horizontal sweep, the vertical sweep having a frequency of one eighth the frequency of the horizontal sweep in the apparatus illustrated where an eight cylinder engine is under test. The frequency of the vertical sweep may be any integral fraction of the frequency of the horizontal sweep, depending upon the number of cylinders in the engine under test. The vertical sweep output sweep voltage is coupled through a lead 118 to a mixing circuit as will be hereinafter described. Figure 5 shows the wave form of this sweep voltage at 155.

D. *Half-frequency pulse generator*

The vertical sweep generator is triggered by the large amplitude pulses developed by the pin 15. Effectively these second triggering impulses are superimposed upon certain of the first or horizontal triggering pulses, and electronic means are provided for separating the pulses. In addition, inasmuch as two superimposed pulses appear during each engine cycle, it is necessary to divide the frequency of these triggering impulses in half in order to provide a vertical sweep which is triggered only once during each engine cycle.

The electronic means for separating the superimposed second triggering pulses for the vertical sweep from the first triggering pulses for the horizontal sweep comprises a threshold amplifier 120, the cathode of which has a variable positive bias developed across a divider network comprising a resistor 121 which may have a value of 100,000 ohms and a variable resistor 122 which may have a maximum value of 10,000 ohms. A by-pass condenser 123 having a value of 8 microfarads is connected across the variable resistor. The pulses 90a and 90b of Figure 5 are applied to the grid of the triode 120, and the variable resistor 122 is set at a point such that the triode 120 is caused to conduct only by the superimposed portion of the pulses 90a which portion represents the pulses developed by the capacity between the pin portion 15b and the auxiliary pickup 19. The negative pulses in the anode circuit of the triode 120 are coupled through a condenser 124 into the grid circuit of a pulse shaping triode 125 and appear as positive pulses in the anode circuit of this latter triode. Figure 5 shows the positive pulses 126 at the plate of the triode 125. These pulses are inverted in phase in a triode 127, the anode output of this triode being shown at 128 in Figure 5.

In order to halve the frequency of these pulses, a multivibrator is utilized comprising a pair of triodes 130 and 131. These triodes are connected as an Eccles-Jordan triggering circuit, the cathodes being connected to ground through a common variable resistor 132 which may have a maximum value of 8,000 ohms. The respective anodes of the triodes are connected to B plus through respective resistors 133 and 134 which may each have a value of 15,000 ohms, and the anodes and grids are interconnected in known manner, a parallel circuit including a resistor 135 and a condenser 136 connecting the anode of the triode 131 to the grid of the triode 130 and a similar parallel circuit including a resistor 137 and a condenser 138 connecting the anode of the triode 130 to the grid of the triode 131. These resistors may each have a value of 180,000 ohms and the condensers may each have a value of .01 microfarad. The respective grid circuits of the multivibrator are connected to ground through respective resistors 140 and 141. These resistors may each have a value of 68,000 ohms.

In the circuit above described, one side of the multivibrator will be conducting while the other side will be cut off. The negative pulses 129 are applied simultaneously to both multivibrator grids through leads 139 and 139a. If it is assumed that the triode 130 is initially conducting while the triode 131 is cut off, the first negative pulse 128 cuts off the triode 130, causing its anode voltage to rise sharply. The coupling between the anode of the triode 130 and the grid of the triode 131 results in simultaneous triggering of the triode 131 despite the negative pulse applied to its grid, since the positive voltage change from the anode of tube 130 is greater than the negative change from the anode of tube 127. The next negative pulse causes the multivibrator to return to its initial condition, and consequently the anode voltage of the tube 130 comprises a series of square waves of one half the frequency of the pulses 128. The wave form of the anode voltage of the triode 130 is shown in Figure 5 at 142. These half frequency square waves are applied to a differentiator circuit comprising a condenser 143 which may have a value of .01 microfarad and a resistor 144 which may have a value of one-half megohm. The differentiator output is applied to the grid of a triode clipper comprising tube stages 145 and 146, and the triggering pulse output from the anode of the triode 146 is applied through a lead 147 to the grid of the vertical sweep generating tube 111. The wave shape at the anode of the triode 146 is shown at 148 in Figure 5.

E. *Mixing circuits*

The marking pulses from the gear teeth 11, the timing pulses from the pickup member 20 and the sequentially occurring cyclically repeating voltage to be indicated (as spark impulses) are mixed by means of a resistance network in the cathode circuit of a mixing tube 150 which has the vertical sweep applied to its grid. As pointed out earlier, the marking impulses shown at 76 in Figure 5 are taken from the cathode follower stage 67 by a lead 149 connected to the cathode follower and incorporating the condenser 77. The timing impulses which indicate top dead center or some other desired predetermined position in a cycle of operation of each of the cylinders are obtained from the pickup member 20. The divided or notched capacitive impulses provided by this member are converted into voltage impulses in the oscillator 64 and amplifier 65 in the same manner as described in detail in connection with the marking impulses. The wave shape at the anode of the triode 65 is shown in Figure 5 at 151, the pulses being divided or slotted so that actually each pulse comprises two portions spaced in phase in an amount determined by the width of the slot 21 in the pickup member 20. These divided pulses 151 are applied through a lead 152 to the grid of a triode 153. The wave form of the differentiated pulses in the anode circuit of tube 153 is shown at 154 in Figure 5. The point at which the differentiated wave crosses the horizontal sweep trace line in Figure 4 is the exact center of the slot 21 in the pickup member 20, thereby providing timing pulses which are extremely accurate. In Figure 4 the point 32a where the differentiated pulse crosses the horizontal sweep line may be determined within a fraction of a degree, whereas if a single relatively broad pulse were used, it would be impossible to determine the position of the timing mark within several degrees.

These differentiated timing pulses, together with the marking pulses 76 and the spark input impulses, are all applied to the cathode of the mixing tube 150. As pointed out earlier, the spark impulses may be developed by any commonly known pickup, as for example, an inductive pickup, and may be fed to the cathode of the tube 150 through a shielded cable 155 and a resistor 160 which may have a value of 100,000 ohms. The cathode resistor 157 has applied therto the marking, timing and spark impulses, and the anode circuit of the tube 150 therefore includes the vertical sweep voltage (which is applied to the grid of said tube and the wave form of which is shown at 156 in Figure 5), the marking pulses, the timing pulses and the spark pulses. These voltages are applied through a shielded cable 158 to the oscilloscope to provide a combined indication as shown in Figure 4, wherein a simultaneous indication is provided of the spark advance angle for each cylinder of an eight cylinder engine, together with timing impulses to locate a predetermined condition of operation (as top dead center), and together with marker impulses to provide a ready means for calibrating the angle of spark advance.

While I have shown and described one embodiment of my invention, it is subject to many modifications. Changes, therefore, in the construction and arrangement may be made without departing from the spirit and scope of the invention as set forth in the appended claims.

I claim:

1. Apparatus of the character described for providing a simultaneous indication of a plurality of sequentially occurring cyclically repeating voltages, comprising: means for developing a triggering voltage comprising cyclically repeating pips having a repetition rate directly proportional to the repetition rate of one of said sequentially occurring voltages; means for developing sweep initiating pips; a circuit triggered by said sweep initiating pips for developing a first sweep voltage equal in frequency to the repetition rate of one of said sequentially occurring voltages multiplied by the number of sequentially occurring voltages; a circuit triggered by said sweep initiating pips for developing a second sweep voltage equal in frequency to the repetition rate of one of said sequentially occurring voltages; circuit connections coupling said triggering pips to said sweep circuits; circuit connections between said second sweep circuit and the sources of said sequentially occurring voltages providing means for modulating said second sweep voltage with said sequentially occurring voltages; and means for providing a combined indication of said first and second sweep voltages.

2. Apparatus of the character described for providing a simultaneous indication of a plurality of sequentially occurring cyclically repeating voltages, comprising: means for developing first and second triggering voltages comprising cyclically repeating pips, said first triggering pips having a repetition rate equal to the repetition rate of one of said sequentially occurring voltages multiplied by the number of sequentially occurring voltages and said second triggering pips being superimposed upon said first triggering pips and having a repetition rate equal to an integral fraction of the repetition rate of said first triggering pips; means for separating said first and second triggering pips; a circuit for developing a first sweep voltage equal in frequency to the repetition rate of one of said sequentially occurring voltages multiplied by the number of sequentially occurring voltages; circuit connections coupling said first triggering pips into the input of said sweep circuit; a circuit for developing a second sweep voltage equal in frequency to the repetition rate of one of said sequentially occurring voltages; circuit connections coupling said second triggering pips into the input of said second sweep circuit; a circuit connected to said sweep circuits providing a direct current control voltage for controlling the amplitude of said sweep voltages, the amplitude of said control voltage varying directly as a function of the repetition rate of said repeating voltages; circuit connections between said second sweep circuit and the sources of said sequentially occurring voltages providing means for modulating said first sweep voltage with said sequentially occurring voltages; and means for providing a combined indication of said first and second sweep voltages.

3. Apparatus of the character described for providing a simultaneous indication of a plurality of sequentially occurring cyclically repeating voltages, comprising: pickup means for developing first and second triggering voltages comprising cyclically repeating pips, said first triggering pips having a repetition rate equal to the repetition rate of one of said sequentially occurring voltages multiplied by the number of sequentially occurring voltages and said second triggering pips being superimposed upon said first triggering pips and having a repetition rate equal to an integral fraction of the repetition rate of said first triggering pips; electronic means for separating said first and second triggering pips; means for developing sweep initiating pips; a circuit triggered by said sweep initiating pips for developing a first sweep voltage equal in frequency to the repetition rate of one of said sequentially occurring voltages multiplied by the number of sequentially occurring voltages; circuit connections coupling said first triggering pips into the input of said sweep circuit; a circuit triggered by said sweep initiating pips for developing a second sweep voltage equal in frequency to the repetition rate of one of said sequentially occurring voltages; circuit connections coupling said second triggering pips into the input of said second sweep circuit; circuit connections between said second sweep circuit and the sources of said sequentially occurring voltages providing means for modulating said second sweep voltage with said sequentially occurring voltages; and means for providing a combined indication of said first and second sweep voltages.

4. Apparatus of the character described for providing a simultaneous indication of a plurality of sequentially occurring cyclically repeating voltages, comprising: means for developing a marking voltage comprising a plurality of cyclically repeating equally spaced pips having a repetition rate greater than the repetition rate of one of said sequentially occurring voltages multiplied by the number of sequentially occurring voltages; means for developing sweep initiating pips; a circuit triggered by said sweep initiating pips for developing a first sweep voltage equal in frequency to the repetition rate of one of said sequentially occurring voltages multiplied by the number of sequentially occurring voltages; a circuit triggered by said sweep initiating pips for developing a second sweep voltage equal in frequency to the repetition rate of one of said sequentially occurring voltages; circuit connections between said second sweep circuit, the means for developing said marker pips and the sources of said sequentially occurring voltages, providing means for modulating said second sweep voltage with said marker pips and with said sequentially occurring voltages; and means for providing a combined indication of said first and second sweep voltages.

5. Apparatus of the character described for providing a simultaneous indication of a plurality of sequentially occurring cyclically repeating voltages, comprising: means for developing a marking voltage comprising a plurality of cyclically repeating equally spaced pips having a repetition rate greater than the repetition rate of one of said sequentially occurring voltages multiplied by the number of sequentially occurring voltages; means for developing first and second triggering voltages comprising cyclically repeating pips, said first triggering pips having a repetition rate equal to the repetition rate of one of said sequentially occurring voltages multiplied by the number of sequentially occurring voltages and said second triggering pips having a repetition rate equal to an integral fraction of the repetition rate of said first triggering pips; means for developing sweep initiating pips; a circuit triggered by said sweep initiating pips for developing a first sweep voltage equal in frequency to the repetition rate of one of said sequentially occurring voltages multiplied by the number of sequentially occurring voltages; circuit connections coupling said first triggering pips into the input of said sweep circuit; a circuit triggered by said sweep initiating pips for developing a second sweep voltage equal in frequency to the repetition rate of one of said sequentially occurring voltages; circuit connections coupling said second triggering pips into the input of said second sweep circuit; circuit connections between said second sweep circuit, the means for developing said marker pips and the sources of said sequentially occurring voltages, providing means for modulating said second sweep voltage with said marker pips and with said sequentially occurring voltages; and means for providing a combined indication of said first and second sweep voltages.

6. Apparatus of the character described for providing a simultaneous indication of a plurality of sequentially occurring cyclically repeating voltages, comprising: pickup means for developing a marking voltage comprising a plurality of cyclically repeating equally spaced pips having a repetition rate greater than the repetition rate of one of said sequentially occurring voltages multiplied by the number of sequentially occurring voltages; pickup means for developing first and second triggering voltages comprising cyclically repeating pips, said first triggering pips having a repetition rate equal to the repetition rate of one of said sequentially occurring voltages multiplied by the number of sequentially occurring voltages and said second triggering pips being superimposed upon said first triggering pips and having a repetition rate equal to an integral fraction of the repetition rate of said first triggering pips; electronic means for separating said first and second triggering pips; a circuit for developing a first sweep voltage equal in frequency to the repetition rate of one of said sequentially occurring voltages multiplied by the number of sequentially occurring voltages; circuit connections coupling said first triggering pips into the input of said sweep circuit; a circuit for developing a second sweep voltage equal in frequency to the repetition rate of one of said sequentially occurring voltages; circuit connections coupling said second triggering pips into the input of said second sweep circuit; an averaging circuit having an input connected to the source of marker pips and an output connected to both said sweep circuits providing a direct current control voltage for controlling the amplitude of said sweep voltages, the amplitude of said control voltage varying directly as a function of the repetition rate of said marker pips; circuit connections between said second sweep circuit, the means for developing said marker pips and the sources of said sequentially occurring voltages, providing means for modulating said second sweep voltage with said marker pips and with said sequentially occurring voltages; and means for providing a combined indication of said first and second sweep voltages.

7. Apparatus of the character described for providing a simultaneous indication of the spark impulses of a multi-cylinder engine, comprising: pickup means for developing a timing voltage comprising a plurality of cyclically repeating pips each indicating a predetermined position in a cycle of operation of one of said cylinders; a circuit for developing a first sweep voltage equal in frequency to the repetition rate of the spark impulse in one cylinder multiplied by the number of cylinders; a circuit connected to said first sweep circuit providing a direct current control voltage for controlling the amplitude of said first sweep voltage, the amplitude of said control voltage varying directly as a function of the speed of operation of the engine; a circuit for developing a second sweep voltage equal in frequency to the repetition rate of the spark impulse in one cylinder; circuit connections between said first sweep circuit, the timing voltage developing means and the spark impulse sources, providing means for modulating said second sweep voltage with timing marks and spark impulses; and means for providing a combined indication of said first and second sweep voltages.

8. Apparatus of the character described for providing a simultaneous indication of the spark impulses of a multi-cylinder engine, comprising: pickup means for developing a timing voltage comprising a plurality of cyclically repeating pips each indicating a predetermined position in a cycle of operation of one of said cylinders; means for developing first and second triggering voltages comprising cyclically repeating pips having a repetition rate directly proportional to the speed of operation of said engine; means for developing sweep initiating pips; a circuit triggered by said sweep initiating pips for developing a first sweep voltage equal in frequency to the repetition rate of the spark impulse in one cylinder multiplied by the number of cylinders; circuit connections coupling said first triggering pips into the input of said sweep circuit; a circuit triggered by said sweep initiating pips for developing a second sweep voltage equal in frequency to the repetition rate of the spark impulse in one cylinder; circuit connections coupling said second triggering pips into the input of said second sweep circuit; circuit connections between said second sweep circuit, the timing voltage developing means and the spark impulse sources, providing means for modulating said second sweep voltage with timing marks and spark impulses; and means for providing a combined indication of said first and second sweep voltages.

9. Apparatus of the character described for providing a simultaneous indication of the spark impulses of a multi-cylinder engine, comprising: pickup means for developing a timing voltage comprising a plurality of cyclically repeating pips each indicating a predetermined position in a cycle of operation of one of said cylinders; means for developing first and second triggering voltages comprising cyclically repeating pips, said first triggering pips having a repetition rate equal to the repetition rate of the spark impulse in one cylinder multiplied by the number of cylinders and said second triggering pips having a repetition rate equal to the repetition rate of the spark impulse in one cylinder; a circuit for developing a first sweep voltage equal in frequency to the repetition rate of said first triggering pips; circuit connections coupling said first triggering pips into the input of said sweep circuit; a circuit for developing a second sweep voltage equal in frequency to the repetition rate of said second triggering pips; circuit connections coupling said second triggering pips into the input of said second sweep circuit; a circuit connected to both said sweep circuits providing a direct current control voltage for controlling the amplitude of said sweep voltages, the amplitude of said control voltage varying directly as a function of the speed of operation of the engine; circuit connections between said second sweep circuit, the timing voltage developing means and the spark impulse sources, providing means for modulating said second sweep voltage with timing marks and spark impulses; and means for providing a combined indication of said first and second sweep voltages.

10. Apparatus of the character described for providing a simultaneous indication of the spark impulses of a multi-cylinder engine, comprising: pickup means for developing a timing voltage comprising a plurality of cyclically repeating pips each indicating a predetermined position in a cycle of operation of one of said cylinders; means for developing a marking voltage comprising a plurality of cyclically repeating equally spaced pips having a repetition rate equal to a predetermined number of degrees in a cycle of operation of said engine; means for developing sweep initiating pips; a circuit triggered by said sweep initiating pips for developing a first sweep voltage equal in frequency to the repetition rate of the spark impulse in one cylinder multiplied by the number of cylinders; a circuit triggered by said sweep initiating pips for developing a second sweep voltage equal in frequency to the repetition rate of the spark impulse in one cylinder; circuit connections between said second sweep circuit, the means for developing said marker pips, the timing voltage developing means and the spark impulse sources, said connections providing means for modulating said second sweep voltage with said marker pips, timing marks and spark impulses; and means for providing a combined indication of said first and second sweep voltages.

11. Apparatus of the character described for providing a simultaneous indication of the spark impulses of a multi-cylinder engine, comprising: pickup means for developing a timing voltage comprising a plurality of cyclically repeating pips each indicating a predetermined position in a cycle of operation of one of said cylinders; means for developing a marking voltage comprising a plurality of cyclically repeating equally spaced pips having a repetition rate equal to a predetermined number of degrees in a cycle of operation of said engine; means for developing first and second triggering voltages comprising cyclically repeating pips having a repetition rate directly proportional to the speed of operation of said engine; means for developing sweep initiating pips; a circuit triggered by said sweep initiating impulses for developing a first sweep voltage equal in frequency to the repetition rate of the spark impulse in one cylinder multiplied by the number of cylinders; circuit connections coupling said first triggering pips into the input of said sweep circuit; a circuit triggered by said sweep initiating impulses for developing a second sweep voltage equal in frequency to the repetition rate of the spark impulse in one cylinder; circuit connections coupling said second triggering pips into the input of said second sweep circuit; circuit connections between said second sweep circuit, the means for developing said marker pips, the timing voltage developing means and the spark impulse sources, said connections providing means for modulating said second sweep voltage with said marker pips, timing marks and spark impulses; and means for providing a combined indication of said first and second sweep voltages.

12. Apparatus of the character described for providing a simultaneous indication of the spark impulses of a multi-cylinder engine, comprising: pickup means for developing a timing voltage comprising a plurality of cyclically repeating pips each indicating a predetermined position in a cycle of operation of one of said cylinders; means for developing a marking voltage comprising a plurality of cyclically repeating equally spaced pips having a repetition rate equal to a predetermined number of degrees in a cycle of operation of said engine; means for developing first and second triggering voltages comprising cyclically repeating pips having a repetition rate directly proportional to the speed of operation of said engine; a circuit for developing a first sweep voltage equal in frequency to the repetition rate of the spark impulse in one cylinder multiplied by the number of cylinders; circuit connections coupling said first triggering pips into the input of said sweep circuit; a circuit for developing a second sweep voltage equal in frequency to the repetition rate of the spark impulse in one cylinder; circuit connections coupling said second triggering pips into the input of said second sweep circuit; an averaging circuit having an input connected to the source of marker pips and an output connected to both said sweep circuits providing a direct current control voltage for controlling the amplitude of said sweep voltages, the amplitude of said control voltage varying directly as a function of the speed of operation of the engine; circuit connections between said second sweep circuit, the means for developing said marker pips, the timing voltage developing means and the spark impulse sources, said connections providing means for modulating said first sweep voltage with said marker pips, timing marks and spark impulses; and means for providing a combined indication of said first and second sweep voltages.

13. Apparatus of the character described for providing a simultaneous indication of the spark impulses of a multi-cylinder engine, comprising: means for developing a timing voltage comprising a plurality of cyclically repeating pips each indicating a predetermined position in a cycle of operation of one of said cylinders; means for developing sweep initiating pips; a circuit triggered by said sweep initiating pips for developing a first sweep voltage equal in frequency to the repetition rate of the spark in one cylinder multiplied by the number of cylinders; a circuit triggered by said sweep initiating pips for developing a second sweep voltage equal in frequency to the repetition rate of the spark in one cylinder; circuit connections between said second sweep circuit, the timing voltage developing means and the spark sources, providing means for modulating said second sweep voltage with timing marks and spark impulses; and means for providing a combined indication of said first and second sweep voltages.

References Cited in the file of this patent

UNITED STATES PATENTS

| Number | Name | Date |
|---|---|---|
| 2,263,859 | Eldredge | Nov. 25, 1941 |
| 2,355,363 | Christaldi | Aug. 8, 1944 |
| 2,394,196 | Morgan | Feb. 5, 1946 |
| 2,412,350 | Morgan | Dec. 10, 1946 |
| 2,430,154 | Woodward | Nov. 4, 1947 |
| 2,485,343 | Zuschlog | Oct. 18, 1949 |
| 2,525,893 | Gloess | Oct. 17, 1950 |
| 2,608,093 | Traver | Aug. 26, 1952 |